Figure 1:
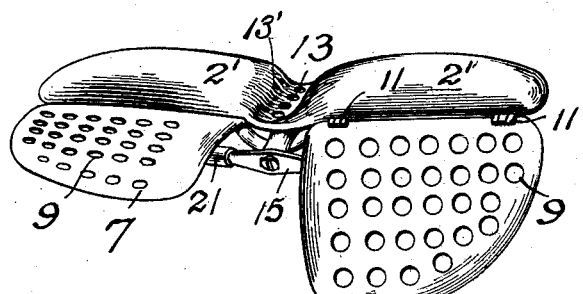

(No Model.)

A. E. PECK & C. G. HAWLEY.
BICYCLE SEAT.

No. 603,734. Patented May 10, 1898.

Witnesses:
E. E. Van Doren.
M. E. Gooley

Inventors
Arthur E. Peck.
Charles G. Hawley
By Paul & Hawley
their Att'ys.

United States Patent Office.

ARTHUR E. PECK AND CHARLES G. HAWLEY, OF MINNEAPOLIS, MINNESOTA; SAID HAWLEY ASSIGNOR TO SAID PECK.

BICYCLE-SEAT.

SPECIFICATION forming part of Letters Patent No. 603,734, dated May 10, 1898.

Application filed January 14, 1896. Serial No. 575,461. (No model.)

*To all whom it may concern:*

Be it known that we, ARTHUR E. PECK and CHARLES G. HAWLEY, of the city of Minneapolis, county of Hennepin, State of Minnesota, have invented certain new and useful Improvements in Bicycle-Seats, of which the following is a specification.

Our invention relates to bicycle saddles or seats, and particularly to devices of this class in which pommels are dispensed with and in which there is a stationary part or seat proper to carry the main part of a rider's weight, while moving parts placed beneath the legs of the rider move therewith and supplement the main portion as a support for the rider.

The general object of our invention is to improve the device shown and described in Letters Patent No. 572,062, granted to Arthur E. Peck November 24, 1896.

The especial object of our invention is to provide a bicycle-seat constructed and operative in perfect accordance with a rider's body and its movements, furnishing a sure and comfortable support or seat, while avoiding the common and well-known faults of the ordinary saddle; and the particular object of this invention is to provide in a cheap and durable form an improved broad flat bicycle-seat which will have a much larger seat area than the bicycle-saddle in common use, by which the evils of the common saddle, and in particular of any of the wedge-shaped patterns, are entirely avoided, which will have a wide, flat, level, and easy seat-surface supplemented by parts which act to make the forward edge thereof imperceptible to a rider sitting thereon; and a further object is to provide auxiliary or supplementary supports or flaps of such a nature and construction as to afford full ventilation and avoid friction, to make a general provision for perfect ventilation throughout the seat, and to provide more perfect means whereby the reciprocation of the auxiliary supports or flaps is accomplished.

It is a furthur object of the invention to provide an easy spring or cushion whereby the greater part of the vibration is absorbed.

Our invention consists generally in a bicycle-seat having a stationary support, preferably an upholstered or cushioned section, to receive the main portion of the weight of the rider and having hinged or equivalently operative at its forward edge two independent sections or flaps preferably connected to rise and fall alternately with the legs of the rider and forming supports auxiliary to that of the main section, all of the construction and combination of parts hereinafter described, and particularly pointed out in the claims.

The invention will be more readily understood by reference to the accompanying drawings, forming part of this specification, and in which—

Figure 2:
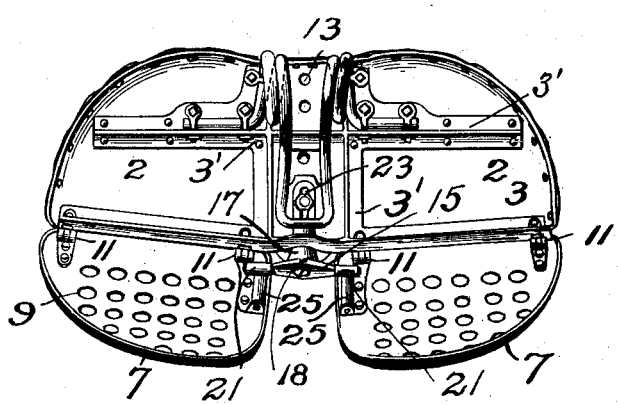
Figure 5:
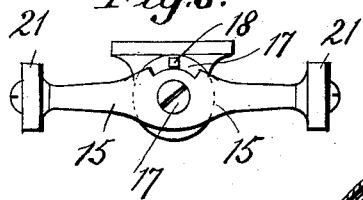
Figure 3:
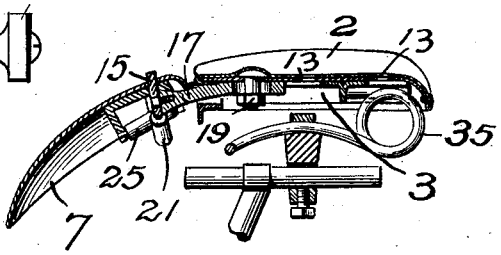
Figure 4:

Figure 1 is a perspective view of a bicycle-seat embodying our invention. Fig. 2 is a plan view from beneath, the hinged sections or flaps being shown in their middle positions. Fig. 3 is a vertical and longitudinal section midway of the seat. Fig. 4 is an enlarged detail of the connection-lever by which the movements of the flaps or auxiliary sections are communicated from one to the other. Fig. 5 is an enlarged detail view showing the relation of the connection-lever and stop-lug.

As shown in the drawings, the main part of the seat comprises the frame or plate 2, provided on its top with a pad or pads 2'. The plate 2 is preferably of sheet metal, is flat, and being formed to a desired shape is provided with a strengthening-flange 3, which preferably depends. The plate is strengthened and stiffened by a light bar or bars 3', applied to its under side, which bars or trusses are additionally employed as a fastening for the carrying or cushion spring 35. The pad upon the top of the seat is preferably divided by a middle and longitudinal channel 13', which, with holes 13 piercing the cushion, the top, and the metal plate, insures perfect ventilation. The pads 2', by the depression at the middle, are made independent, as the stiffening cannot pass from one side to the other. The seat-cushion will therefore keep its shape for a much longer time than if it were made as a single cushion continuous across the top.

The leather cover is fastened by stitching or rivets to the flange 3 of the metal portion, and at the middle eyelets are employed, so that the ventilating-holes may be retained, while the leather is at the same time fastened securely at the bottom of the wide channel 13'.

The forward or auxiliary sections 7 are preferably made of smooth light metal, having slightly-curved upper surfaces, and these sections are preferably perforated or provided with a series of holes 9. These holes lighten the structure, add to the neat appearance of the device, insure perfect ventilation, and lessen the frictional contact between the sections and the legs of the rider. It is not desirable to cover the forward sections in any manner, it being much preferred that they should be perfectly smooth, while the surface of the rear section may, if desired, be provided with a rough surface, which will prevent the rider from slipping thereon.

The sections 7 are preferably secured to the metallic frame 2 by suitable hinges 11, and the form of the hinges is continued along the upper edge of each section, the edges being curled, so that practically piano-hinges are made, with the result that the crack between the parts is at all times closed. The sections 7 are set at different angles, the forward edge of the rear section being formed on lines diverging from the middle thereof, the joint-lines upon opposite sides of the seat being made to conform as nearly as possible to the natural lines of the gluteal folds of the human body. By so arranging the movable sections 7 all the effects of a hard line or sharp edge at the forward part of the seat are avoided. A further result of this particular arrangement of the movable sections or flaps is that in working up and down their outer edges practically drop below the inner ends thereof, so that the flaps are presented to the inner sides of the legs, whereby the flaps are made in a certain measure to perform the office of a pommel and also prevent the rider from slipping sidewise upon the seat.

We prefer to provide means for positively connecting the two movable sections, so as to cause them to alternately rise and fall. In Figs. 1, 2, 3, and 4 we have shown one means for securing this result. As here shown, this consists of a simple lever 15, pivoted upon the stud 17, preferably extending from the rear part of the seat. Over the inner end of the stud is the broad foot, provided with a slot 23, and it is secured by a suitable bolt or bolts 19, upon which the stud is adjustable to be moved back and forth, whereby adjustment of the movements of the flaps is obtained. The stud 17 projects forward from the rear section and between the sections 7, and the lever 15 is centrally pivoted thereon and is of sufficient length to reach beneath the adjacent ends or edges of the two sections 7. All the sections are provided with light antifriction-rolls 25, secured in any suitable manner to the under sides of the flaps or sections and of sufficient length to make contact with the ends of the lever at all points in their movements. In addition to the rolls 25 we may provide extra rolls 21 upon the ends of the lever. These latter, however, may in many instances be dispensed with.

To prevent the lever from swinging around into a vertical position, where it would not engage with the movable sections, we preferably provide the stud 17 with a stop lug or projection 18, to be engaged by the lever. The short lever 15 forms a reciprocating connection between the two movable sections, for as one section is depressed one end of the lever will be forced down, with the result that the other end will be raised and by its engagement with the under side of the flap will raise the opposite flap or section. All friction between the parts is avoided by employing the friction-rolls shown or equivalent devices. In place of the lever 15 we may employ other means for connecting the two sections or auxiliary parts 7.

Any suitable spring 35 may be employed to carry the seat. The same may be a flat spring or, as we prefer, a spring of the form shown in Figs. 2 and 3. As here shown, the spring 35 has the central U-shaped portion 36, to which the clip may be readily attached to secure the seat to the bicycle-frame. This part of the spring is curved, as shown in Fig. 3, to allow the seat to be tilted forward or back by a simple adjustment in the clip. Each branch of the U is coiled into one, two, or more coils, and the free ends of the springs being fastened at the back of the plate 2 are carried forward a short distance and thence outwardly, being secured by convenient fastenings preferably provided upon the truss or angle-bars 3', which are on the under side of the main section. The fastenings for the ends of the springs are preferably small clips.

Having thus described our invention, we claim as new and desire to secure by Letters Patent—

1. The combination, in a bicycle-seat, of a rear or main section, with pivoted auxiliary sections, and a pivoted lever provided between said sections and upon the ends of which said sections rest and are freely movable, the depression of either auxiliary section being adapted through the medium of said lever to raise the other auxiliary section, substantially as described.

2. The combination, in a bicycle-seat, of a rear or main section, with the independent reciprocating forward sections forming extensions thereof, and a single pivoted lever forming the reciprocating connection between said parts and whereon said forward sections rest, substantially as and for the purpose specified.

3. The combination, in a bicycle-seat, with a suitable support, of independent sections pivoted thereon, a pivoted lever arranged transversely between said sections and whereon the same rest and are freely movable, substantially as and for the purpose specified.

4. The combination, in a bicycle-seat, of a rear or main section, with the forward hinged or pivoted sections, a pivoted lever, and rolls 25 provided upon said forward sections and bearing upon said lever, substantially as and for the purpose specified.

5. The combination, in a bicycle-seat, of the main section, with the independent sections hinged thereto and provided with rolls 25, a stud 17 secured to the main section, a lever 15 pivoted upon said stud and whereon said rolls 25 bear, substantially as described.

6. The combination, in a bicycle-seat, of a main section, with two independent reciprocating sections provided at the forward edge thereof, a centrally-pivoted lever transversely arranged between said sections and upon the ends of which the same bear, and said lever being longitudinally adjustable to relatively raise and lower said independent sections, substantially as described.

7. The combination, with the main section, of the hinged sections, the stud 17 provided upon the main section, a lever 15 pivoted on said stud and whereon said hinged sections rest, and a stop 18 provided on said stud to limit the movement of said lever, substantially as described.

In testimony whereof we have hereunto set our hands this 7th day of January, A. D. 1896.

ARTHUR E. PECK.
CHARLES G. HAWLEY.

In presence of—
A. C. PAUL,
M. E. GOOLEY.